UNITED STATES PATENT OFFICE.

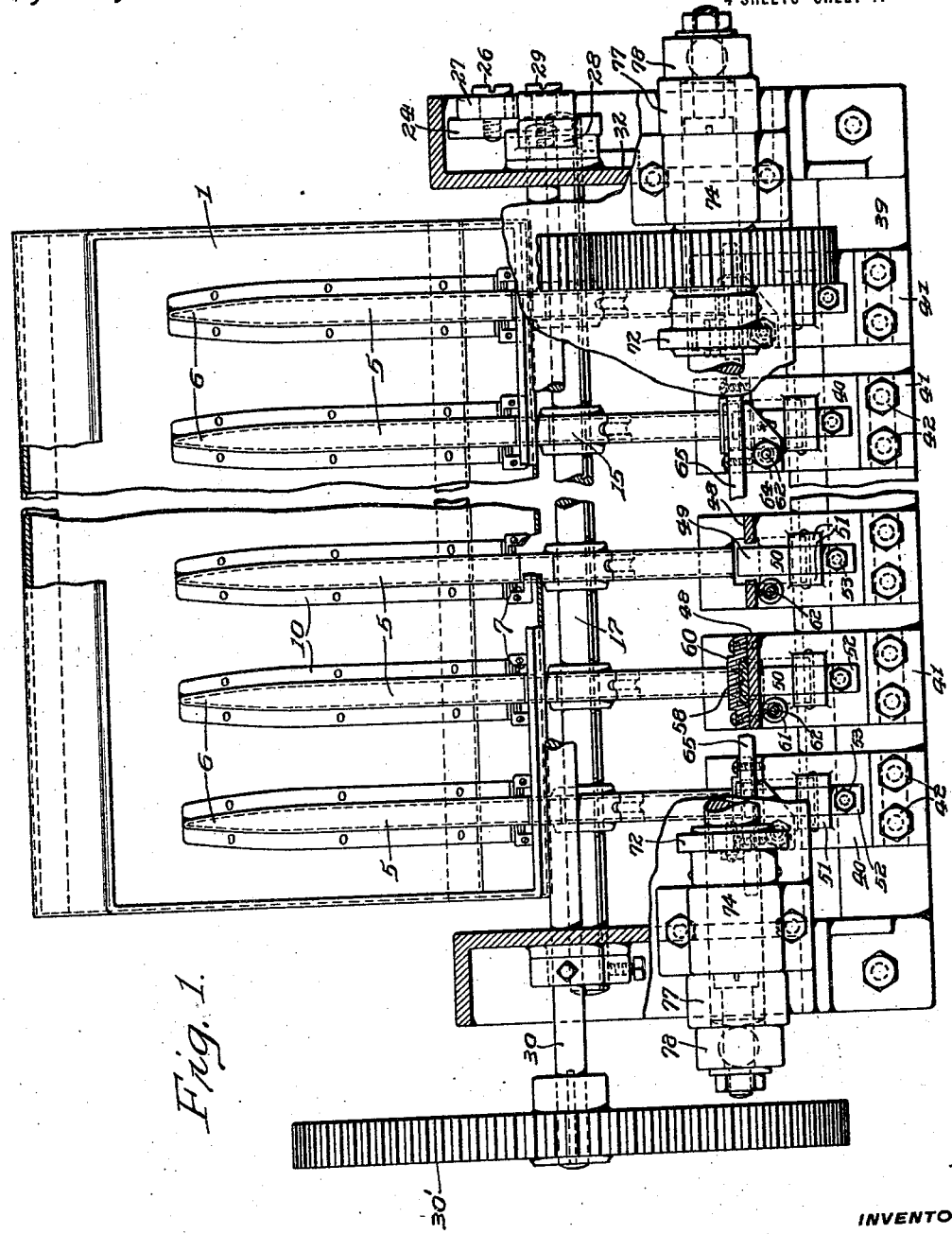

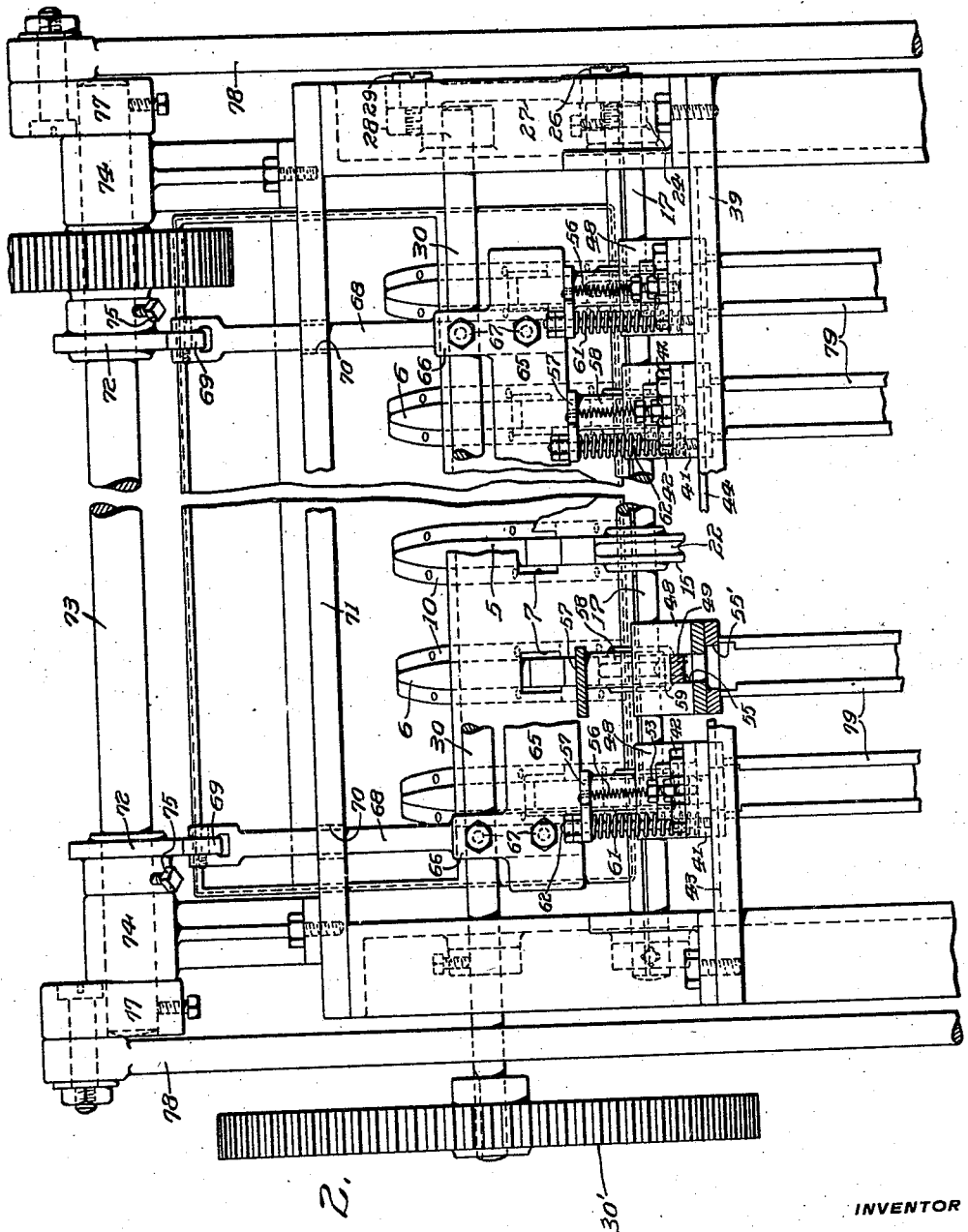

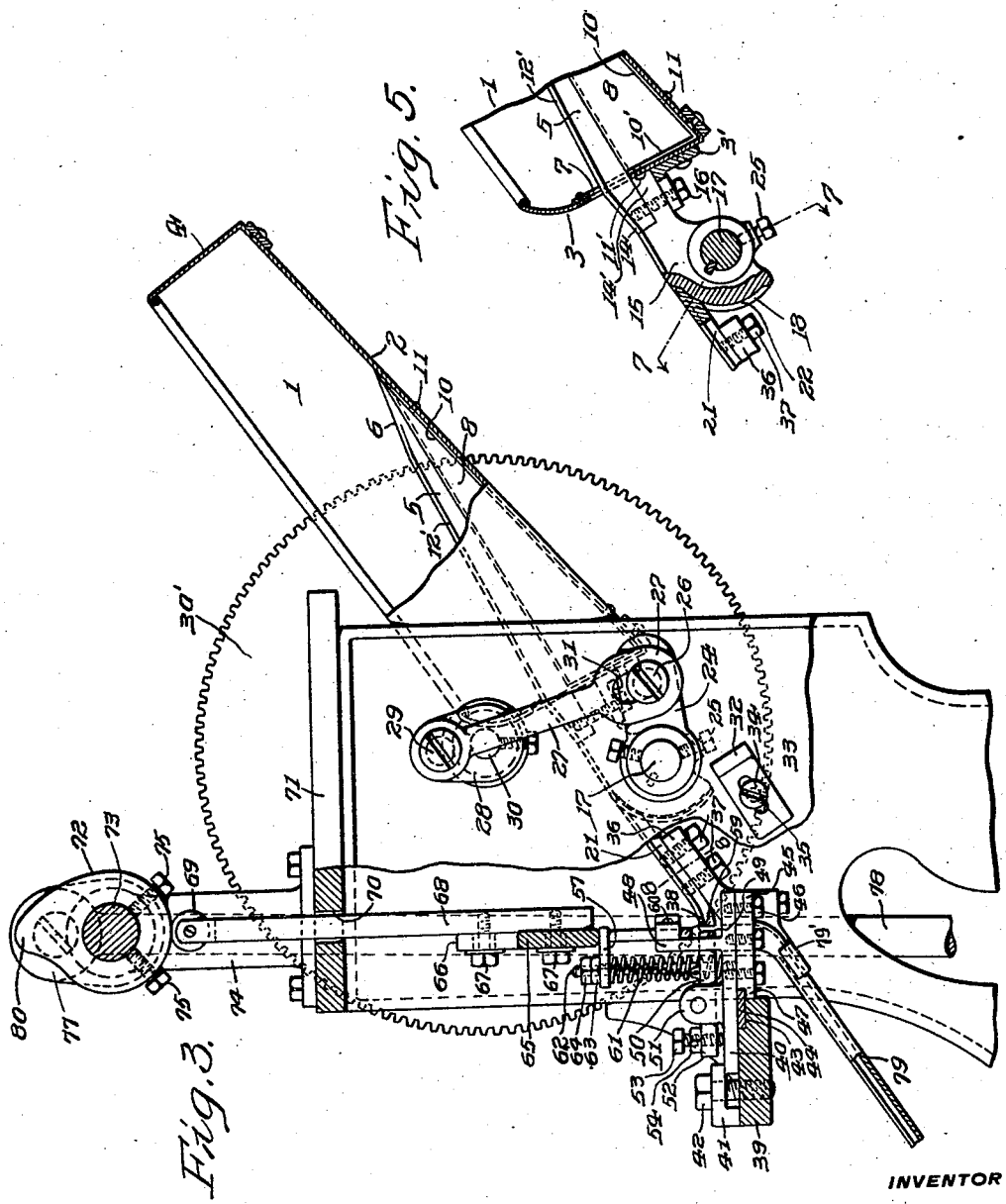

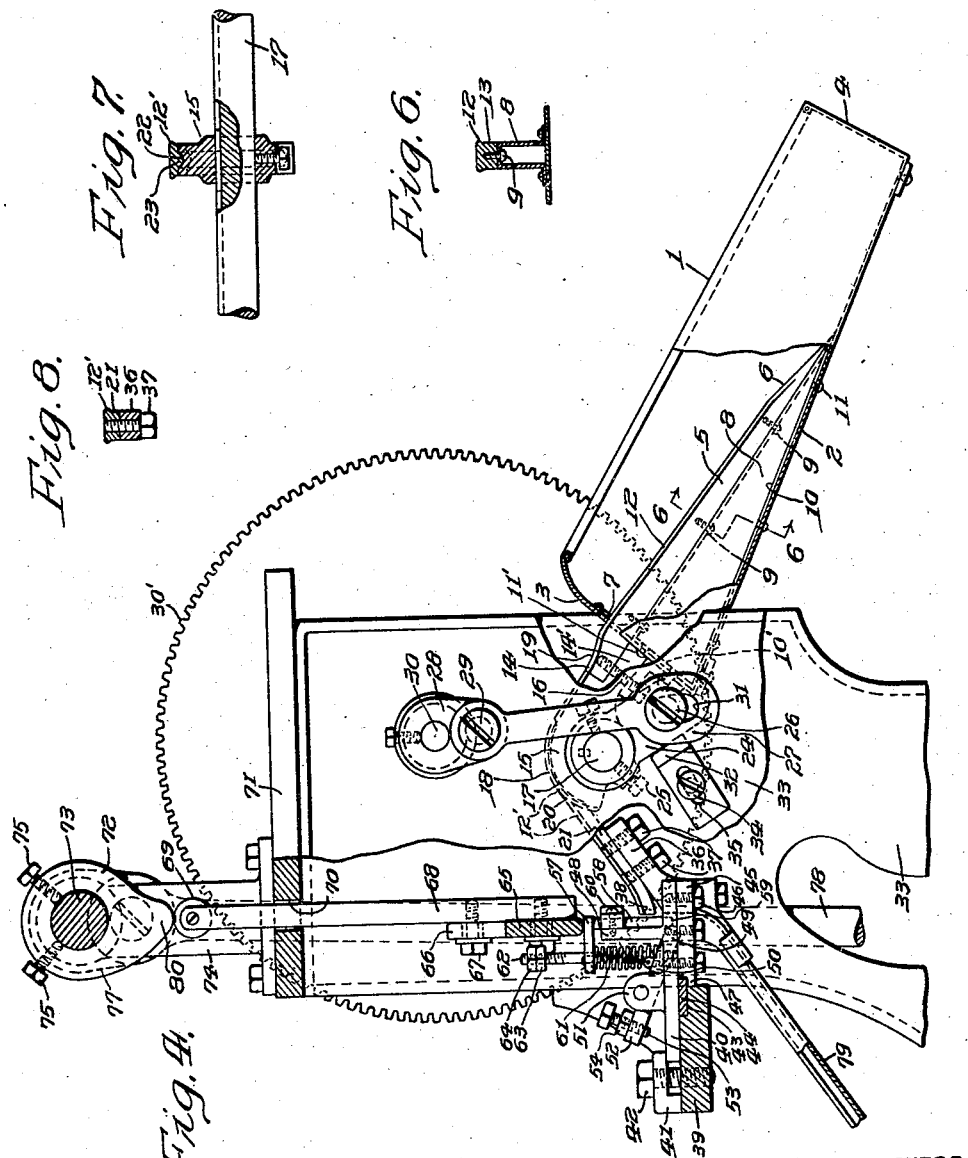

HARRISON B. WALTER, OF PHILADELPHIA, PENNSYLVANIA, ASSIGNOR TO FIBRE CONTAINER COMPANY, A CORPORATION OF PENNSYLVANIA.

MULTIPLE STAPLING MACHINE.

1,417,704.    Specification of Letters Patent.    Patented May 30, 1922.

Application filed August 19, 1919. Serial No. 318,546.

*To all whom it may concern:*

Be it known that I, HARRISON B. WALTER, a citizen of the United States, and a resident of the city of Philadelphia, county of Philadelphia, State of Pennsylvania, have invented certain new and useful Improvements in Multiple Stapling Machines, of which the following is a specification, reference being had to the accompanying drawing, forming a part thereof.

The invention relates to a stapling machine of the multiple type wherein any number of a plurality of staples may be simultaneously driven through and clinched about the parts to be secured together by such staples.

The invention, however, relates more particularly to the staple separating and selecting and feeding devices of which the former is in the form of a reciprocating pan or hopper and the latter receive staples from said pan or hopper in a certain order and feed, as required, a plurality of said staples simultaneously to the respective points where the driving and clinching are performed. The invention relates to a machine of the type shown and described in my copending application, Serial No. 290,155, filed April 15, 1919.

As in said copending application, one of the objects of the present invention is to provide a machine that is adapted to use previously made staples with automatic means to select and separate and feed the same in multiple to the driving and clinching devices.

Another object is to construct a machine with a novel and useful common means for containing and controlling the position of all of the made staples and from which means the staples for the several driving means may be separated and selected and fed as required.

Another object is to provide a machine with a novel and useful means for separating and selecting and properly positioning the separated and selected staples in proper order to be successively operated upon by the feeding means.

A still further object is to provide a machine of the aforesaid character with a new and useful staple containing pan or hopper which will more efficiently and efficaciously separate and select the staples in multiple for a continuous supply thereof to the feeding mechanisms.

Other useful and advantageous objects of my invention will be disclosed by the following specification and illustrated in the accompanying drawing.

As aforesaid, the present invention relates to a machine for driving made staples in multiple rather than for successively driving staples made from a piece of wire or strip stock of indefinite length from which the staple pieces must first be cut and then shaped into the form of staples prior to their stapling function. The advantages of using made staples for the purposes mentioned are clearly set forth in my aforesaid copending application.

A practical embodiment of my invention is illustrated in the accompanying drawing, in which:

Fig. 1 is a top plan view of the device;

Fig. 2 is a front elevation of the same with parts shown in section;

Fig. 3 is a view in side elevation, partly in section, of the same with the parts in one position of operation;

Fig. 4 is a similar view with the parts shown in another position of operation;

Fig. 5 is a fragmentary sectional view of a part of the staple selecting and separating and guiding means;

Fig. 6 is a transverse sectional view of a saddle bar and its support taken on the line 6—6 of Fig. 4;

Fig. 7 is a framentary transverse sectional view of a separator hanger taken on the line 7—7 of Fig. 5, and, Fig. 8 is a transverse sectional view of the bridge member and its support, taken on the line 8—8 of Fig. 3.

Referring now more particularly to the drawing in which similar reference characters are used to designate the corresponding parts in the several views, I have shown in a multiple stapling machine of the type referred to above, generally, a reciprocating hopper or pan for containing a mass of made staples, including saddle bar separating means for receiving, guiding and directing the separated staples or fastening elements from the hopper to the feeding devices, and feeding devices for receiving said staples from said saddle bar and for simultaneously feeding the staples to a plurality of raceways or chutes wherein the staples simultaneously move by gravity to the several driving and clinching means, which may be of any suitable type, or those referred to and disclosed in my copending application hereinbefore mentioned.

The staple storing and containing means comprises a hopper or pan 1 of generally rectangular shape but with the bottom 2 thereof inclining downwardly to one end 3 of the pan at a greater depth than at the other end 4 and provided therein with a plurality of substantially parallel saddle bars 5, which are tapered to a point at the rear ends 6 thereof. The bars are disposed at an angle to the bottom of the pan and extend at the other ends thereof through the openings 7 provided in the end wall 3 of the pan. Beneath each saddle bar are provided double walled members 8 which act to support the saddle bars in position relative to the pan as well as providing partitions beneath the saddle bars for the purpose of preventing any of the staples becoming entangled or entrapped between the saddle bars and the bottom of the pan. These members 8, shown in cross-section in Fig. 6, are formed of sheet metal, are suitably secured to the lower surface of the saddle bars by means of screws 9 and are suitably provided at the base thereof with the flanges 10 adapted to be secured to the bottom wall 2 of the pan by the screws or rivets 11. The walls of the members 8 are further provided at the ends adjacent the end 3 of the pan with flanges 10' also secured to the end wall 3 by means of screws or rivets 11'. The top surfaces of the saddle bars are substantially flat and are provided at the upper lateral edges thereof with the enlarged portions 12' which over-hang the lateral surfaces 13 of the saddle bars. Frictional contact or engagement between the legs of a staple, moving over the saddle bars, and the lateral surfaces 13 is thus reduced to a minimum.

The ends 14, of the saddle bars 5, projecting through the openings 7 in the end wall 3 of the pan are rigidly secured to the shouldered or reduced end portion 14' of the saddle bar hangers 15 by means of screws 16. Angle iron brackets 3' may be also rigidly secured to both the end walls 3 of the pan, by suitable means, such as rivets or screws, and to the lower side of the end portions 14' by means of the screws 16. The hangers 15 are supported upon the shaft 17 and keyed thereto to rotate therewith. Each hanger is provided with a peripheral guide surface 18 which blends into the curved surface 19 of the free end 14 of the saddle bar 5 and which is also adapted to pass under the tapered end 20 of the bridge member 21 so that during an angular oscillation of the hangers 15 about the axis of the shaft 17 there is always provided a continuous smooth path over which the staples may travel from the saddle bars to the bridge members. The peripheral guide surface 18 on each hanger 15 may be provided with a narrow groove 22 in which is adapted to fit a tongue 23 integrally provided on the lower portion of the tapered end 20 of the bridge 21. This means provides for maintaining the hanger and bridge in proper alinement irrespective of the relative angular movements therebetween.

The shaft 17 at an end thereof, preferably at the right side of the machine as viewed in Fig. 2, has suitably secured thereto a crank arm 24 by means of set screws 25. The free end of the crank is provided with a pivot stud 26 with which may be loosely connected the slotted end of a link 27, the latter being pivotally connected at the other end thereof to a crank 28, as by means of a pivot stud 29. The crank 28 is mounted upon a continually rotating shaft 30 and is secured thereto for rotation therewith by any suitable means such as set screws or by a key. The link 27 is provided with an elongated slot 31 by means of which the connection between the link 27 and the pivot stud 25 is a loose connection whereby the link may have a certain amount of idle movement relative to the stud at the end and at the start of the oscillation of the pan 1. The other end of the shaft 30 may be provided with the gear 30' driven from any suitable means, such as is disclosed in my aforesaid copending application.

At a short distance below the shaft 17 is provided an abutment stop 32, which may be suitably fixed to the side wall 33 of the machine by means of screws 34 passing through elongated slots 35 provided in the flange thereof. The elongated slot provides for a means for adjustably setting or securing the stop in the position desired. The stop is located with relation to the crank 24 for permitting the latter to abut against the stop member 32 in its downward movement with the pan 1. As the pan and the crank are thus suddenly brought to a stop by contact with such stop, the link 27 will be adapted to idly move relative to the pivot stud 25 by reason of the elongated slot 31 and to the extent of the length of said slot. This provides for a sudden jarring action to the pan and its contents at each time that the link engages with the stud 25 in the upward movement of such link and at each time the pan is brought to a stop by the contact of the crank 24 with the stop 32.

Each bridge member 21 is suitably secured in an inclined position, greater than the angle of repose, to the supporting bracket 36 by means of screws 37, with the lower end 38 of the bridge member curving into a horizontal position adjacent to the picking off plunger of each feeding means.

Transversely of the machine and between the side walls 33 thereof is supported, at a suitable height, a carrier 39 upon which are mounted the staple feeding devices. Each of the latter comprises a base plate 40 supported upon the carrier 39 in predetermined adjusted spaced relation to the other base plates and secured in stationary position by an L-shaped clamping member 41 and the clamp screws 42. The carrier is provided longitudinally thereof with a groove 43 in which is located a guide track 44 against the edge of which is adapted to be slidably guided the base plates 40 when relative adjustment thereof is being made. Each plate 40 also has provided at the under side thereof the bracket base 45 which may be secured thereto by means of screws 46 or the like. Each base 45 is provided with a flange 47 adapted to underhang the track 44 for maintaining the same and the attached base 40 in proper guiding engagement with such track. The bracket base may be formed integral with the bridge supporting bracket 36, with the latter extending upwardly through a portion of the opening or slot 55 provided in each base plate 40.

Each of the base plates 40 is also provided with an upwardly extending integral stop member 48 of the shape of an inverted U. These stop members are located opposite the ends 38 of the bridge members 21 and are also spaced therefrom a distance slightly greater than the width of the head of a staple. In the opening provided between the legs of a stop member 48 projects the end 49 of a trip lever 50, such end extending towards and in close proximity to the lower end 38 of the bridge 21. Each of said trip levers is supported in a pivot bracket 51 integrally formed with the base plate 40 and projecting upwardly therefrom. Each of the trip levers may also be provided with a rearwardly extending arm 52 through which may be threaded an abutment screw 53, the lower end of such screw being adapted to contact with the top surface of the base plate 40. Each abutment screw may be locked in an adjusted position by the lock nut 54. The end 49 of each trip lever 50 lies adjacent to the lower end 38 of the bridge member 21 with the upper surface of said trip lever and said bridge lying in the same plane and with the widths of said trip lever and said bridge member equal to the width of the saddle bar, that is to say, slightly less than the distance between the legs of a staple. The top surfaces of the hanger and the bridge, over which the staples travel, are similar to that of the saddle bars and are also provided with the lateral overhanging portions or enlargements 12' as in the case of the saddle bars. From the above, it may be seen that the staples may slide successively along the saddle bars, the peripheries of the saddle bar hangers, the bridge members and finally over the end 38 thereof onto the end 49 of the trip lever, with the leading staple of each line of staples abutting against the stop member 48 and remaining in that position with the legs of the staples pendant on each side of the trip lever, until the staples are forced downwardly through the openings 55 and 55' provided in the base plates and bracket bases respectively beneath the end 49 of the trip lever. The end 49 of each trip lever projects beyond the stop member 48, merely the distance substantially equal to the width of the head of a staple so that only one staple may be supported upon the end of each trip lever at a time. Each trip lever may be maintained in its staple receiving and supporting or uppermost position by means of a spring 56 connected at an end thereof to said trip lever and at the other end thereof to a cross head 57 located at a suitably spaced distance above the trip lever. Each cross head overhangs the end of the trip lever, as well as the bridge member, and is provided with a downwardly extending picking-off plunger 58 of a thickness substantially equal to the width of a staple head and of a width substantially equal to the length of such staple head. The lower end 59 of the plunger 58 is adapted, in the downward movement thereof, to engage with a staple head and to force said staple downwardly into the openings 55 and 55'. Each plunger in its movement is guided through a guide strap 60 suitably secured to the upper end of the stop member 48, as by screws or similar attaching means.

Each of the feed plungers is normally held upwardly by a coiled compression spring 61 which is interposed between and expansibly reactive against the cross head 57 and the base plate 40. Each cross head is provided with an aperture through which projects a guide rod 62 rigidly fixed at its lower end to the base plate 40, such guide rod acting as a guiding means for the vertical reciprocation of the cross head 57 and the plunger 58. The upper end of each guide rod is provided with an abutment nut 63 and a lock nut 64, which may be adjustably threaded on the end of said guide rod for adjustably limiting the upward movement of the cross head and the feed plunger. The coiled spring 61 may, if desired, be located to surround and be guided by said guide rod 62.

Transverse of the machine extends a horizontal feed bar 65 which normally rests upon all of the cross heads 57 and which is adapted, in the downward movement thereof, to force said cross heads and plungers also downwardly. The feed bar may be provided with vertically extending portions 66 to which may be suitably secured, as by screws 67, vertically reciprocable cam rods 68 at the upper ends of which may be mounted cam rollers 69. These cam rods extend upwardly through and are guided in the openings 70, provided in the top plate 71 of the machine, toward the cams 72 mounted upon the shaft 73 suitably supported in the bearings 74 mounted upon said top plate 71. The cams 72 may be secured to said shaft 73 in any suitable manner, as by means of the set screws 75, by which the cam may be adjustably set relative to said shaft as desired. The cam rollers 69 are normally urged in contact with the surface of the cam 72 by the action of the coil spring 61 acting through the cross heads 57, feed bar 65 and the cam rods 68.

To the shaft 73 are also secured, at the ends thereof, the thrust cranks 77, to which are pivotally connected to the upper ends of the thrust rods 78, with the lower ends thereof pivotally connected to a driving and clinching means of any suitable type, such as that disclosed in my copending application hereinbefore referred to. It may be observed, therefore, from the above, that the rotation of the shaft 73 will operate the staple feeding mechanism simultaneously with or in predetermined relation with the operation of the driving and clinching means for feeding staples thereto in proper time relation.

Beneath each base plate 40 and bracket base 45 is secured, in any suitable manner as by screws 46, a raceway bracket 79' in which is supported the upper open end of an inclined raceway or chute 79 in register with the openings 55 and 55' provided in the base plate 40 and bracket base 45 respectively, and with the lower end thereof connected to the above mentioned driving and clinching means.

In operation, the gear 30' is continually rotating from a suitable source of power, as by a motor, appropriately mounted upon the machine frame, and causes a rotation of the shaft 30 and crank 28 for imparting a reciprocating motion to the link 27, crank 24, shaft 17 and the pan 1, whereby the latter is angularly reciprocated about the axis of the shaft 17 so as to incline the bottom surface of the hopper or pan at opposite angles in such a manner that the staples may be caused to slide backwardly and forwardly over said surface as the hopper is so reciprocated. By such movement of a conglomerate mass of staples, a certain number thereof will be adapted to engage with the tapered and inclined saddle bar in such a way that the staples will straddle such bars, with the legs thereof hanging adjacent the lateral sides of the saddle bars and the heads thereof supported upon the top surfaces of said bars. At the instant when the hopper is inclined upwardly said staples will be caused to slide in line over said saddle bars to the lower ends thereof, then through the guard or gate openings 57, provided in the forward end of the pan, then over the curved surfaces 70 provided at the ends of the saddle bars, then upon the peripheries of the hangers, then over the inclined surface of the bridge to the end thereof and finally sliding therefrom onto the ends 49 of the trip levers 50, as well as into abutting engagement with the stop members 48. The inclination of each saddle bar is such that with a line of staples arranged thereon, the weight of the same is sufficient to force the leading staple over the hanger and bridge member to the trip lever and to also maintain such leading staple upon said trip lever until picked-off by the feed plunger. In the downward movement of the pan 1 the same is suddenly brought to a stop by the crank arm 24 coming into contact with the abutment member 32 whereby a jarring action is produced upon the pan and its contents agitated in order to loosen or disentangle any staples that might have become more or less entangled with each other or upon any of the saddle bars or with certain staples overriding others and similar interfering conditions and also in order that the staples may again be caused to slide backwardly to the rear of the pan preparatory to the next feeding movement thereof toward the saddle bars. As the crank 28 continues to rotate, the lower end of the link 27, by reason of the elongated slot 31, moves idly relative to the pivot stud 26 of the crank arm 24 until stud 26 is engaged by the lower end of the slot 31, whereupon further movement of the link 27 acts to raise the pan upwardly therewith. At the instant of contact between the end of the slot 31 and the stud 26 another jarring or agitating effect is produced upon the pan and its contents similar to that described above. The continued upward movement of the link 27 causes a corresponding upward movement of the pan 1 to its uppermost inclined position. In reaching the latter position the staples are caused to slide to the forward end 3 of the pan with several of the staples engaging with the saddle bars, righting themselves thereupon and sliding through the guard or gate openings 7 in the front end wall 3 of the pan, thence over the bridge members to the feeding device as heretofore described. The partitions provided beneath the saddle bars operate to prevent the staples from becoming entangled between the saddle bars and the bottom of the pan.

At the time when it is desired to drive staples or to feed staples to the driving and clinching mechanism, any suitable means such as disclosed in my aforesaid copending application, may be manually controlled to cause the movement of the thrust rods mounted upon the shaft 73 as well as the cams 72. As the thrust rods are caused to move downwardly the latter will operate the driving and clinching means in the manner described in my aforesaid copending application. The shaft 73 in rotating will cause the cams 72 to rotate therewith to bring the raised portions or swells 80 into engagement with the cam rollers 69 to force the latter with the cam rods 68 downwardly. This also causes a downward movement of the feed bar against all of the cross heads of the picking off-plungers, the latter being brought into engagement with the heads of the staple resting upon the ends 49 of the trip levers and forcibly moving the same from the position shown in Fig. 3 to that shown in Fig. 4, in the latter of which the trip lever is in inclined position and the staple has been fed through the openings 55 and 55' in the base plates 40 and the bracket bases 45 into the open upper end of the raceway or chute 79, in which the staple is adapted to slide by gravity to the driving and clinching means. As the trip levers swing about their respective pivots a position will be reached whereby the end of the trip lever will no longer be in exact vertical alignment with the feed plungers but will swing to one side thereof and will permit the staples to slip off of the ends of said trip levers into the receiving end of the inclined chutes or raceways, as above described. The raceways are inclined at such an angle that the staples will slide downwardly thereof with the points of the staples foremost.

Further rotation of the shaft 73 will cause the cam portions or swells 80 to recede from the cam rollers 69 whereupon the coiled springs 61 will expand and raise the cross heads 57 with the plungers 58, as well as the feed bar 65, cam rods 68 and the rollers 69 into a position where the leading staples of the lines of staples running upon the bridges will pass underneath the ends of said plungers onto the ends 49 of the trip levers preparatory to the next feeding movement. As the cross heads are thus caused to rise, the same will produce a tension in the springs 56, thereby causing said springs to raise said trip levers back into staple receiving and supporting position where the top surface thereof shall align with the top surface of the end 38 of the bridge member. The positioning of these surfaces into alignment is regulated and controlled by the abutment screw 53 provided in the rear end of the trip lever.

In this machine, as in that referred to above, the guide members comprising the hangers and the bridge, as well as the feeding devices, are adjustable relative to each other for spacing the several feeding and guiding devices the proper distances apart the staples are to be driven and clinched. Such parts are then secured into adjusted position by the clamping means heretofore referred to, such as the clamping members 41 and the binding screws 42.

Having thus described one embodiment of my invention it is to be understood, however, that such invention is not to be limited to the particular details herein described or shown upon the drawing, but that the same comprehends other forms and devices adapted to carry out the results herein disclosed without departing from the spirit of my invention and the scope of the appended claims.

Having thus described my invention what I claim as new and desire to secure by Letters Patent is:

1. In a stapling machine provided with driving and clinching means, the combination of reciprocable means for holding a quantity of staples, means located in said holding means at an inclination thereto and reciprocable therewith for separating staples from said quantity of staples upon the reciprocation of said holding and separating means, means connected to said separating means for guiding said separated staples to a feeding position, said guiding means provided with lateral overhanging portions, and feeding means for feeding said staples to said driving and clinching means.

2. In a stapling machine comprising means for driving and clinching staples, the combination of means for holding a quantity of staples, means actuated by power for reciprocating said holding means to agitate said staples, tapered longitudinal separating means provided in said holding means for movement therewith and extending through gate openings provided in a wall of said holding means to the outside thereof for separating and slidably guiding said staples in straddled position thereover, means connected to said extended tapered means for slidably guiding staples therefrom to staple feeding means, power actuated means for picking-off staples in a single multiple and for feeding the same to said driving and clinching means.

3. In a stapling machine comprising a feeding, driving and clinching means, the combination of staple holding and separating means comprising an angularly reciprocated hopper, a plurality of tapered longitudinal members secured within said hopper and at an inclination to the bottom thereof, said members adapted to receive staples in straddled position upon the reciprocation of said hopper and adapted to guide the same longitudinally thereover, said hopper being provided with openings adjacent said members through which said staple guiding members project and through which said staples are adapted to pass, bridge members connected to said guiding members and adapted to guide staples therefrom to staple receiving and supporting positions, said members provided with lateral overhanging portions, trip members adapted to receive and support said staples and picking-off means adapted to feed a single multiple of said staples from said trip members to said driving and clinching means.

4. In a device for operating upon fastening elements, the combination of a reciprocable receptacle for holding said fastening elements, a plurality of tapered longitudinal members in spaced arrangement, said members projecting through openings provided in an end wall of said container, inclined guiding means connected to said projecting ends and having surfaces aligning with the top surfaces of said members, said guiding means being disposed at an inclination and provided at the sides thereof with overhanging portions and at the lower ends thereof with curved surfaces terminating in horizontal portions, a plurality of trip means located adjacent the lower ends of said last mentioned guiding means and provided with top surfaces in the same horizontal plane as the end surfaces of said guiding means, means for pivotally supporting said members and said container, means for reciprocating the same about said supporting means and feeding means for feeding said fastening elements from said trip means.

In witness whereof, I hereunto set my hand this 2 day of August, 1919.

HARRISON B. WALTER.